United States Patent
Bodenstab et al.

(10) Patent No.: US 9,311,291 B2
(45) Date of Patent: *Apr. 12, 2016

(54) CORRECTING N-GRAM PROBABILITIES BY PAGE VIEW INFORMATION

(71) Applicant: INTERNATIONAL BUSINESS MACHINES CORPORATION, Armonk, NY (US)

(72) Inventors: Nathan M. Bodenstab, Melrose, MA (US); Nobuyasu Itoh, Yokohama (JP); Gakuto Kurata, Tokyo (JP); Masafumi Nishimura, Yokohama (JP); Paul J. Vozila, Arlington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 322 days.

This patent is subject to a terminal disclaimer.

(21) Appl. No.: 14/021,607

(22) Filed: Sep. 9, 2013

(65) Prior Publication Data

US 2015/0051902 A1 Feb. 19, 2015

Related U.S. Application Data

(63) Continuation of application No. 13/965,492, filed on Aug. 13, 2013.

(51) Int. Cl.
  *G06F 17/27* (2006.01)
  *G06F 17/20* (2006.01)
  *G06F 17/21* (2006.01)

(52) U.S. Cl.
  CPC ..................................... *G06F 17/27* (2013.01)

(58) Field of Classification Search
  USPC ............................. 704/1, 9, 10, 257, 270–275
  See application file for complete search history.

(56) References Cited

U.S. PATENT DOCUMENTS

| 6,418,431 B1 * | 7/2002 | Mahajan ........... G06F 17/30687 |
| 7,031,908 B1 * | 4/2006 | Huang ................ G10L 15/1815 |
| | | 704/9 |

(Continued)

FOREIGN PATENT DOCUMENTS

| JP | 2000-075886 | 3/2000 |
| JP | 3027544 | 4/2000 |

(Continued)

OTHER PUBLICATIONS

Wang et al. "Extracting Search-Focused Key N-Grams for Relevance Ranking in Web Search". WSDM'12, Feb. 8-12, 2012, Seattle, Washington, USA.*

(Continued)

*Primary Examiner* — Jesse Pullias
(74) *Attorney, Agent, or Firm* — Tuntunjian & Bitetto, P.C.; Vazken Alexanian

(57) ABSTRACT

Methods and a system for calculating N-gram probabilities in a language model. A method includes counting N-grams in each page of a plurality of pages or in each document of a plurality of documents to obtain respective N-gram counts therefor. The method further includes applying weights to the respective N-gram counts based on at least one of view counts and rankings to obtain weighted respective N-gram counts. The view counts and the rankings are determined with respect to the plurality of pages or the plurality of documents. The method also includes merging the weighted respective N-gram counts to obtain merged weighted respective N-gram counts for the plurality of pages or the plurality of documents. The method additionally includes calculating a respective probability for each of the N-grams based on the merged weighted respective N-gram counts.

10 Claims, 7 Drawing Sheets

(56) References Cited

U.S. PATENT DOCUMENTS

| | | | | |
|---|---|---|---|---|
| 7,774,197 B1* | 8/2010 | Bulyko | ............... | G06F 17/2715 704/255 |
| 2011/0172988 A1* | 7/2011 | Wang | ................. | G06F 17/2715 704/9 |

FOREIGN PATENT DOCUMENTS

| | | |
|---|---|---|
| JP | 2000-356997 | 12/2000 |
| JP | 2004-126143 | 4/2004 |
| JP | 3628245 | 3/2005 |
| JP | 2007-058311 | 3/2007 |
| JP | 2012-018633 | 1/2012 |
| WO | 2010/021368 | 2/2010 |
| WO | 2010/125736 | 11/2010 |

OTHER PUBLICATIONS

Klakow et al., "Log-Linear Interpolation of Language Models", Proc. ICSLP, Dec. 1998. (4 pages).

Sethy et al., "Building topic specific language models from webdata using competitive models", In Interspeech 2005, Sep. 2005. (4 pages).

Wikipedia definition of Zipf's law: http://en.wikipedia.org/wiki/Zipf%27s_law. Jul. 2013. (8 pages).

* cited by examiner

CORRECTING N-GRAM PROBABILITIES BY PAGE VIEW INFORMATION

RELATED APPLICATION INFORMATION

This application is a Continuation application of co-pending U.S. patent application Ser. No. 13/965,492 filed on Aug. 13, 2013, incorporated herein by reference in its entirety.

BACKGROUND

1. Technical Field

The present invention relates generally to language models and, in particular, to correcting N-gram probabilities by page view information.

2. Description of the Related Art

An N-gram based language model is a construct/method for predicting probabilities of sentences on the basis of occurrence probabilities of N word sequences, and widely used in speech recognition, machine translation, and information retrieval. Since a large amount of training data is required to estimate probabilities accurately, it is usual to crawl web sites and collect the training data. N-gram probability is calculated from the frequency of each event. The sizes of texts on topics will be sharply reflected in N-gram probabilities on the corresponding topics.

Typically, the number of web sites and the total size of documents related to a topic are considered to be correlated with the frequency of the topic mentioned in Internet users. However, the preceding statement is not always true. For example, sometimes a very small number of eager contributors write many articles on a topic. Taking WIKIPEDIA® as an example, the sizes of the documents on specific topics (i.e., train, game) or person (entertainers) are significantly larger than others. However the topics are not necessarily mentioned with high frequencies.

In "suggest functions" provided in search engines (e.g., GOOGLE®), candidate words and phrases will be suggested on the basis of the frequencies of users' inputs. The probabilities should be almost optimal. However, such frequencies are not available to entities other than the search engine providers.

SUMMARY

According to an aspect of the present invention, a method is provided for calculating N-gram probabilities in a language model. The method includes counting N-grams in each page of a plurality of pages or in each document of a plurality of documents to obtain respective N-gram counts therefor. The method further includes applying weights to the respective N-gram counts based on at least one of view counts and rankings to obtain weighted respective N-gram counts. The view counts and the rankings are determined with respect to the plurality of pages or the plurality of documents. The method also includes merging the weighted respective N-gram counts to obtain merged weighted respective N-gram counts for the plurality of pages or the plurality of documents. The method additionally includes calculating a respective probability for each of the N-grams based on the merged weighted respective N-gram counts.

According to another aspect of the present invention, a method is provided for calculating N-gram probabilities in a language model. The method includes sorting a plurality of pages or a plurality of documents based on at least one of view counts and rankings to obtain sorted pages or sorted documents. The method further includes classifying the sorted pages or the sorted documents into M subsets. The method also includes counting N-grams in each of the M-subsets. The method additionally includes estimating respective N-gram probabilities for each of the N-grams in each of the M-subsets using a maximum likelihood method. The method further includes interpolating the estimated respective N-gram probabilities to minimize a cross entropy there between.

According to yet another aspect of the present invention, a system is provided for calculating N-gram probabilities in a language model. The system includes an N-gram counter for counting N-grams in each page of a plurality of pages or in each document of a plurality of documents to obtain respective N-gram counts therefor. The system further includes a weighted N-gram counter for applying weights to the respective N-gram counts based on at least one of view counts and rankings to obtain weighted respective N-gram counts. The view counts and the rankings are determined with respect to the plurality of pages or the plurality of documents. The system also includes an N-gram merger for merging the weighted respective N-gram counts to obtain merged weighted respective N-gram counts for the plurality of pages or the plurality of documents. The system additionally includes a probability calculator for calculating a respective probability for each of the N-grams based on the merged weighted respective N-gram counts.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to correcting N-gram probabilities by page view information. While one or more embodiments of the present principles are described herein with respect to speech recognition, it is to be appreciated that the present principles are not limited to the same, and can be used with respect to other technological areas and applications, while maintaining the spirit of the present principles.

For example, the present principles can also be implemented with respect to machine translation, part-of-speech tagging, parsing, and information retrieval. These and other applications to which the present principles can be applied are readily determined by one of ordinary skill in the art, while maintaining the spirit of the present principles.

Figure 1:
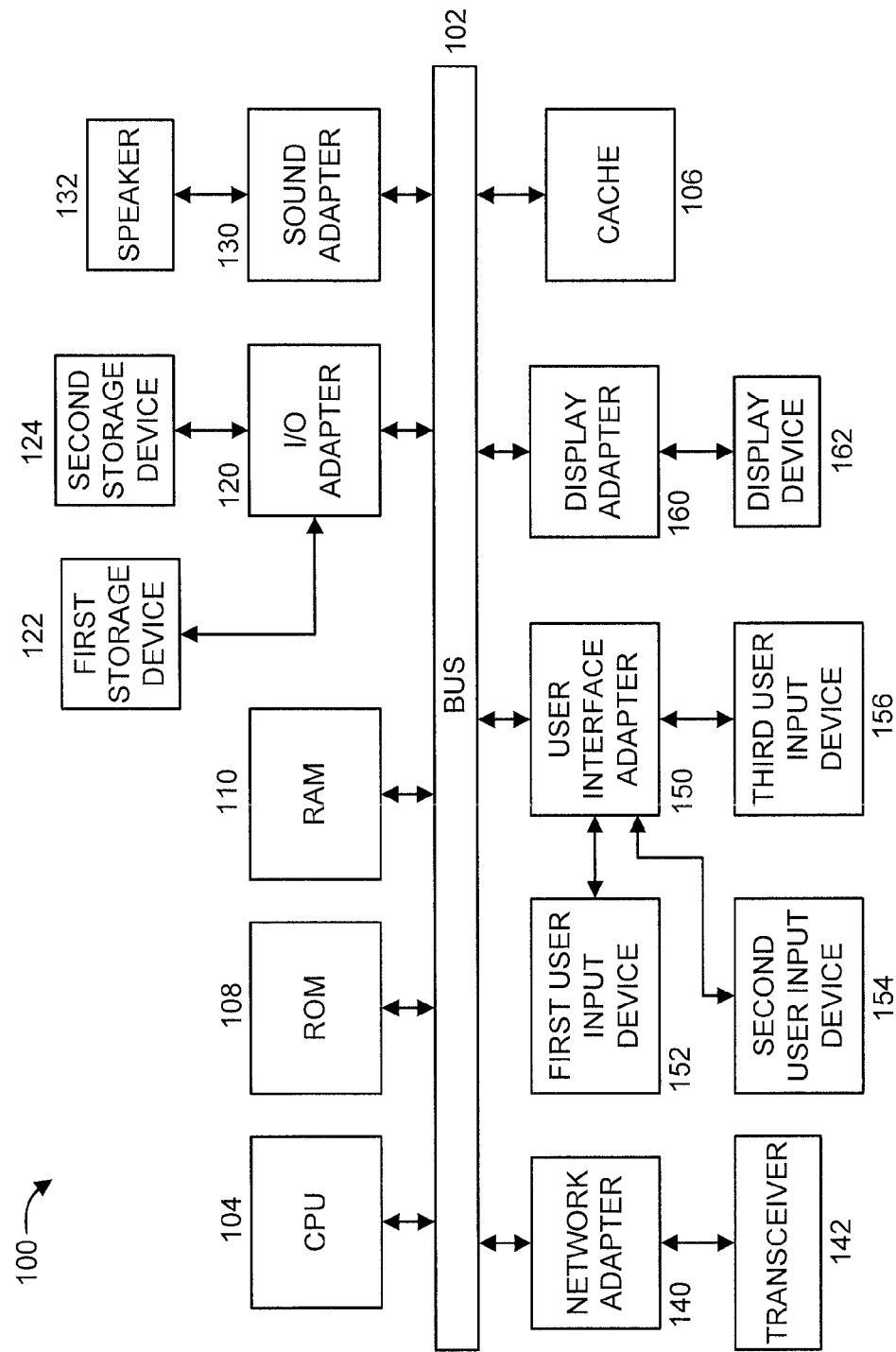
FIG. 1 shows an exemplary processing system 100 to which the present invention may be applied, according to an embodiment of the present invention.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operative coupled to system bus 102 by the sound adapter 130.

A transceiver 142 is operatively coupled to system bus 102 by network adapter 140.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

A display device 162 is operatively coupled to system bus 102 by display adapter 160.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
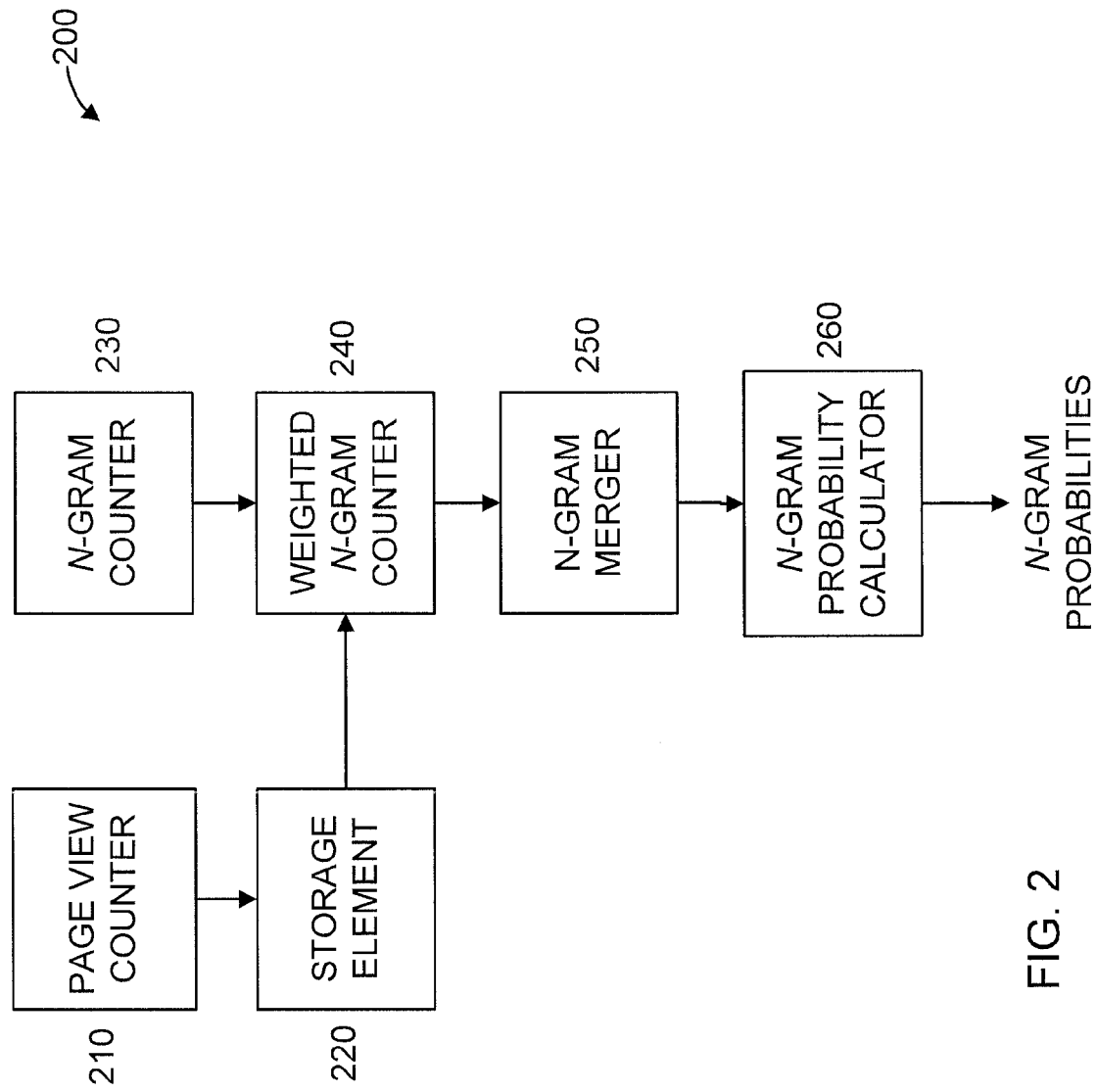
FIG. 2 shows a system 200 for correcting N-frame probabilities by page view information, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
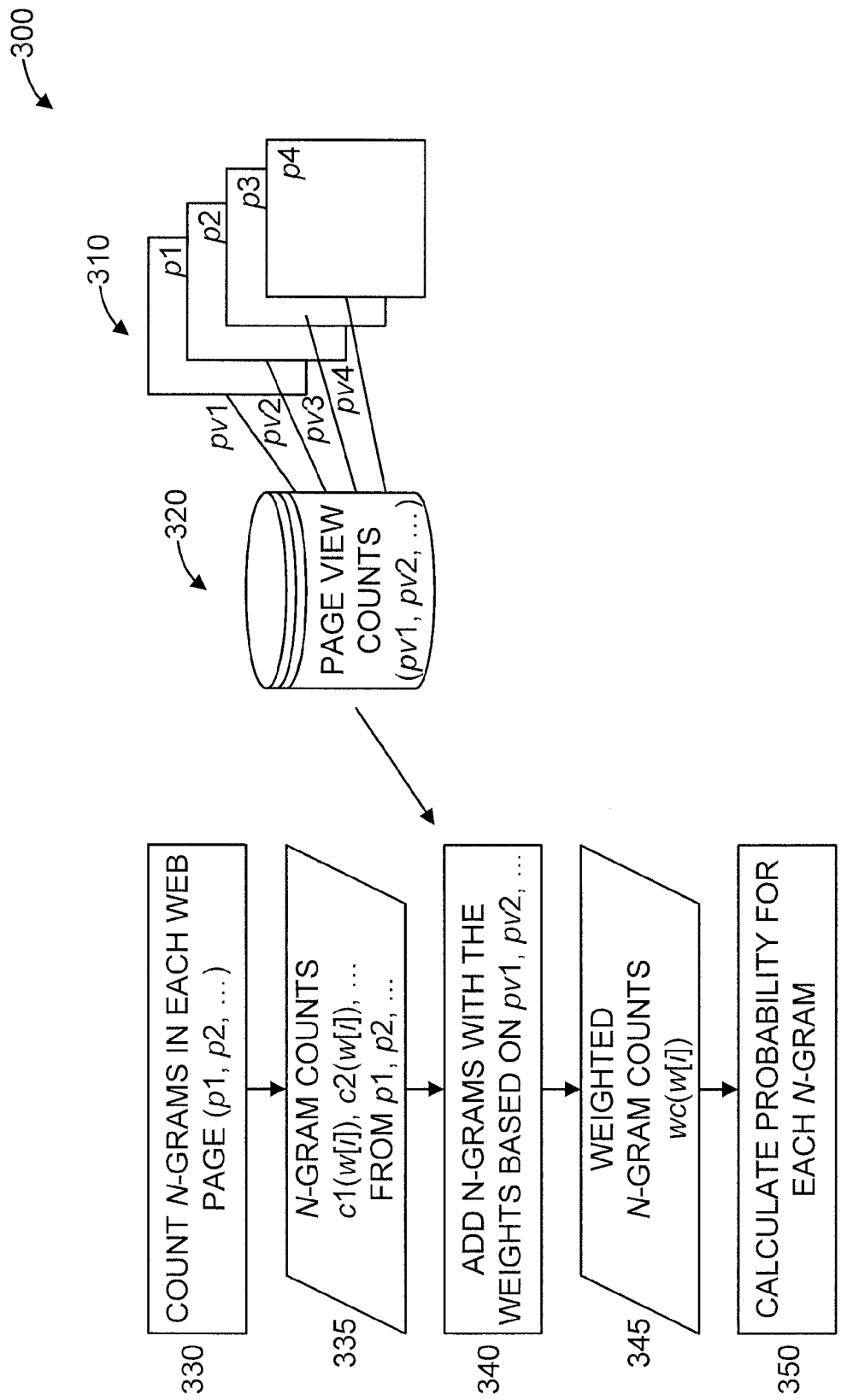
FIG. 3 shows a method for correcting N-gram probabilities by page view information, in accordance with an embodiment of the present principles.
Figure 4:
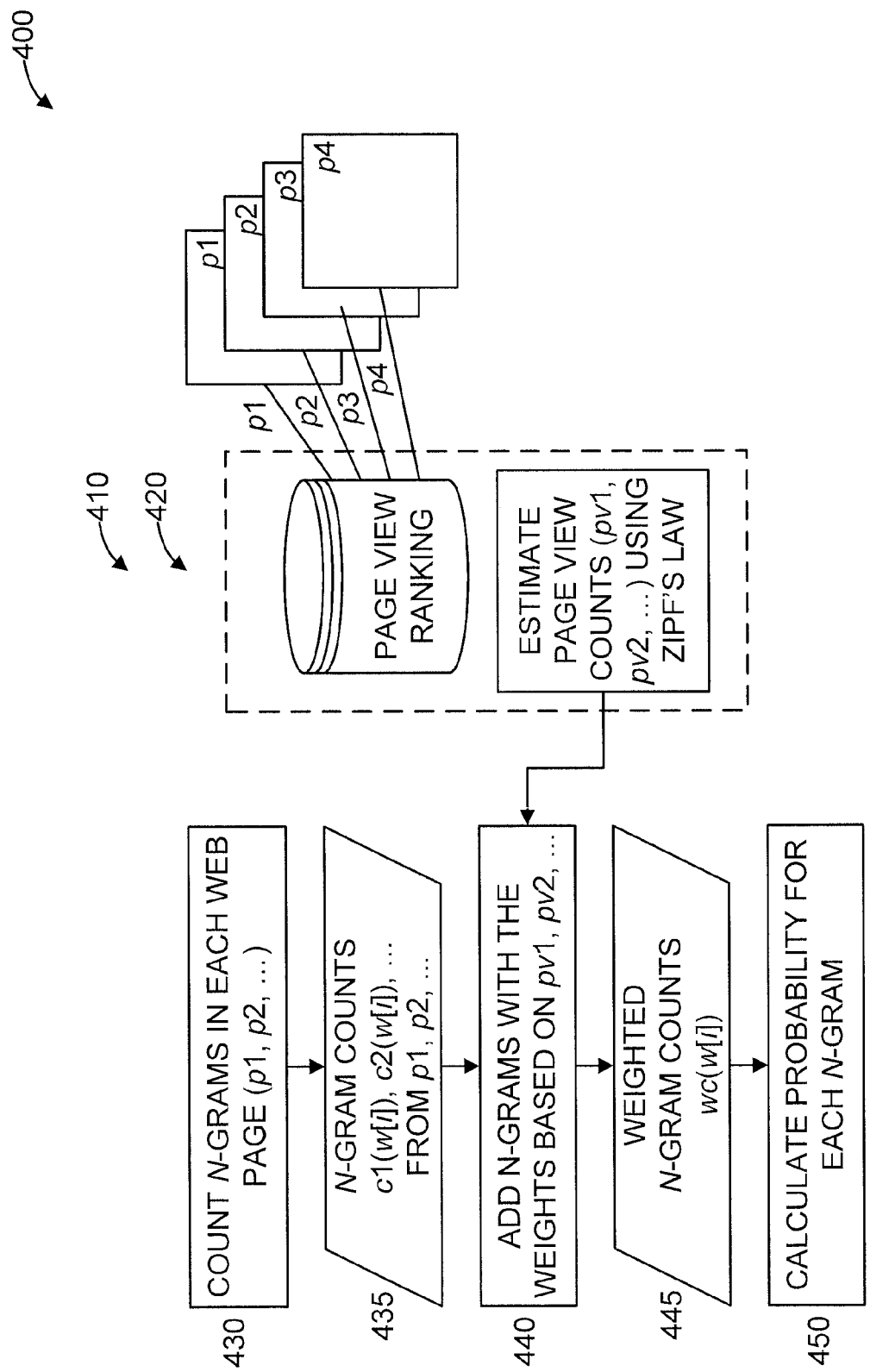
FIG. 4 shows a method for correcting N-gram probabilities by page view information, in accordance with a first alternate embodiment of the present principles.
Figure 5:
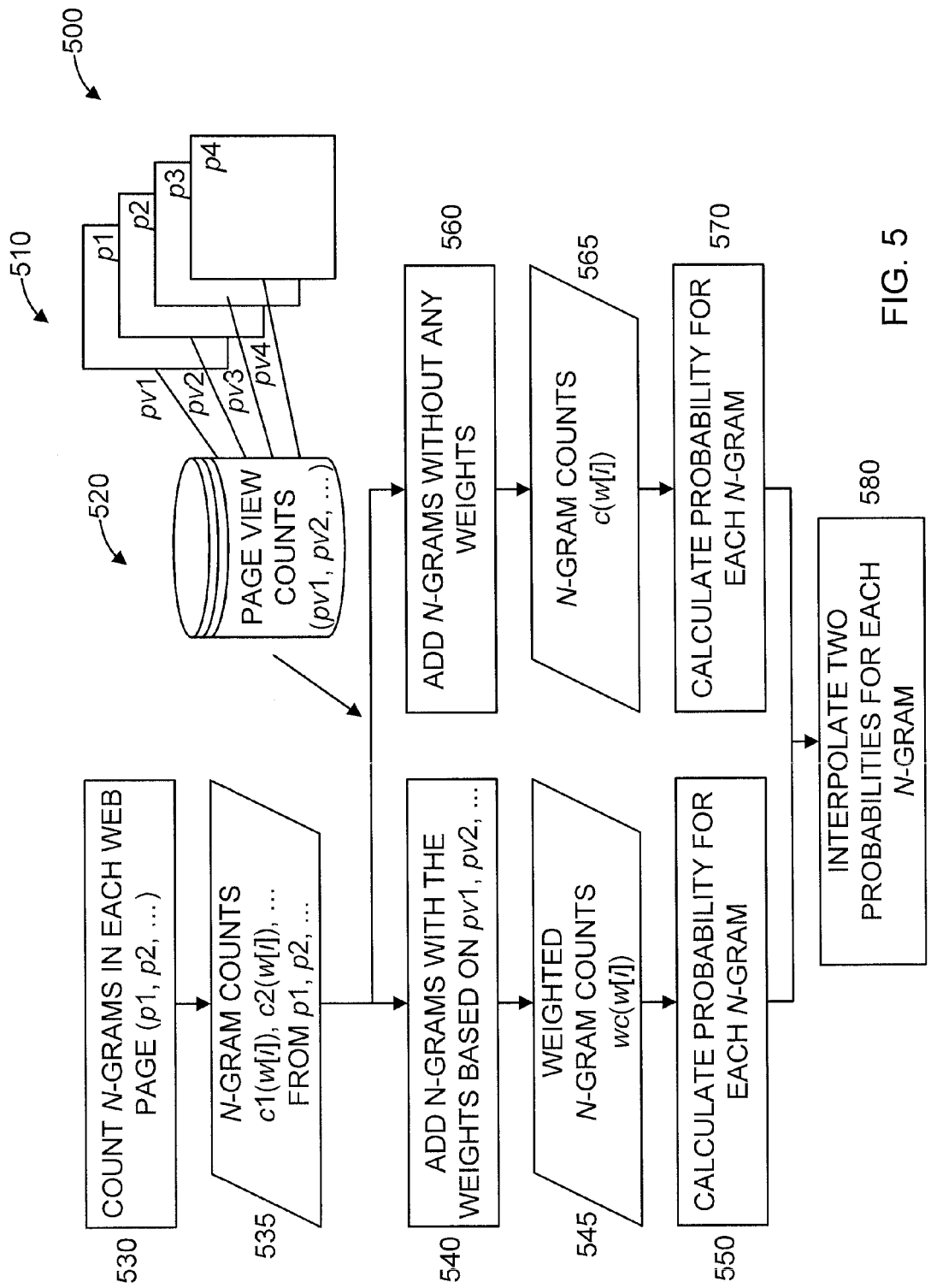
FIG. 5 shows a method for correcting N-gram probabilities by page view information, in accordance with a second alternate embodiment of the present principles.
Figure 6:
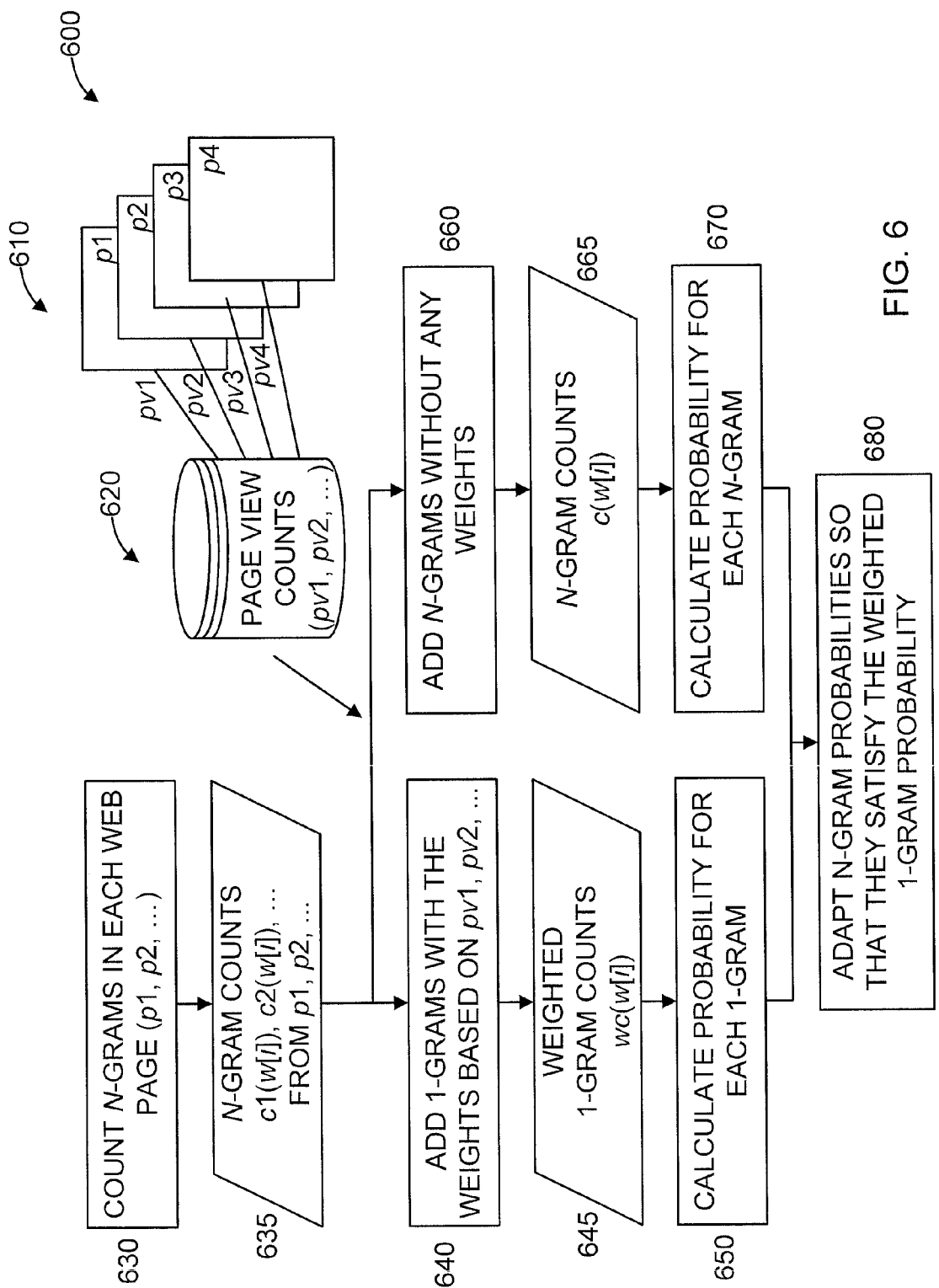
FIG. 6 shows a method for correcting N-gram probabilities by page view information, in accordance with a third alternate embodiment of the present principles.
Figure 7:
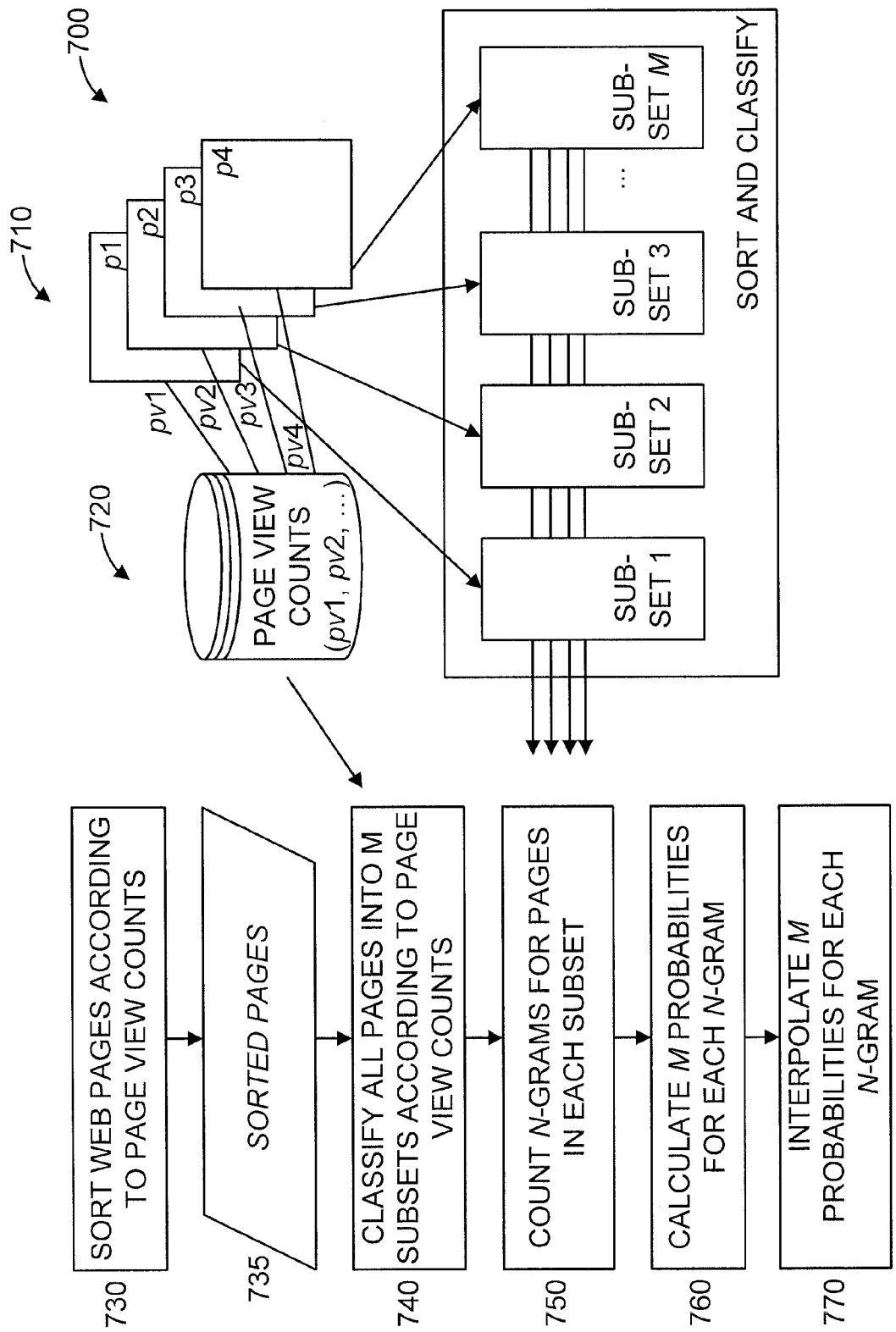
FIG. 7 shows a method for correcting N-gram probabilities by page view information, in accordance with a fourth alternate embodiment of the present principles.

Further, it is to be appreciated that processing system 100 may perform at least part of the method described herein including, for example, at least part of method 300 of FIG. 3 and/or at least part of method 400 of FIG. 4 and/or at least part of method 500 of FIG. 5 and/or at least part of method 600 of FIG. 6 and/or at least part of method 700 of FIG. 7. Similarly, part or all of system 200 may be used to perform at least part of method 300 of FIG. 3 and/or at least part of method 400 of FIG. 4 and/or at least part of method 500 of FIG. 5 and/or at least part of method 600 of FIG. 6 and/or at least part of method 700 of FIG. 7.

FIG. 2 shows a system 200 for correcting N-frame probabilities by page view information, in accordance with an embodiment of the present principles. The system includes a page view counter 210, a storage element 220, a N-gram counter 230, a weighted N-gram counter 240, and a N-gram probability calculator 250. The page view counter 210 determines/estimates page view counts from web pages. The storage element 220 stores at least the page view counts. The N-gram counter 230 generates N-gram counts from the web pages. The weighted N-gram counter 240 generates weighted N-gram counts. The N-gram probability calculator 250 calculates N-gram probabilities. The functions of the elements of system 200 are described in further detail with respect to the following flowcharts.

FIG. 3 shows a method for correcting N-gram probabilities by page view information, in accordance with an embodiment of the present principles.

At step 310, determine page view counts (pv1, pv2, ...) from web pages (p1, p2, ...).

At step 320, store the page view counts (pv1, pv2, ...) in a storage element (e.g., a database).

At step 330, count N-grams in each web page (p1, p2, ...). Further regarding step 330, an output thereof (denoted by the reference numeral 335) includes the N-gram counts $c1(w[i])$, $c2(w[i])$, ... from p1, p2, ....

At step 340, add the N-grams with the weights based on pv1, pv2, .... Further regarding step 340, an output thereof (denoted by the reference numeral 345) includes the weighted N-gram counts $wc(w[i])$.

At step 350, calculate the probability for each N-gram.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

A description will now be given of the use of page views, in accordance with an embodiment of the present principles.

In various web sites such as WIKIPEDIA®, statistics on how many people visited documents (pages), which is called page-view count, is available. Moreover, some statistics are not frequency of visiting, but simply ranking. For the purposes of the present principles, we interchangeably call viewing frequencies (e.g., with respect to a particular page, document, etc.) as "page-view count" and "view count". Moreover, while some embodiments specifically mention page-view counts, it is to be appreciated rankings can also be used in place of, or in addition to, the page-view counts.

In accordance with the present principles, we propose a method for correcting N-gram probabilities using page-view counts, and for creating a language model that is dependent not on contributors but on topics mentioned by general Internet users. It is to be appreciated that page-view count does not correspond to the frequency of each word or phrase and is not applicable to N-gram probability estimations straightforwardly. We therefore calculate N-gram probabilities considering page-view count as follows.

According to a first embodiment, we count N-grams in each page (or document), and merge the counts putting pageview based weights on them. Let an N word sequence (N-gram) be $w_i = w_{i-N-1} w_{i-N-2}, \ldots, w_i$ and the page-view of a page (or document) be $PageView_j$, where $w_i$ indicates the $i^{th}$ word in the N word sequence. Weighted counts $Count_{pv}(w_i)$ and N-gram probability $P_{pv}(w_i)$ are calculated as follows:

$$Count_{pv}(w_i) = \frac{\sum_j PageView_j \times Count_j(w_i)}{\sum_j PageView_j}, \quad (1)$$

$$P_{pv}(w_i) = \frac{Count_{pv}(w_i)}{\sum_i Count_{pv}(W_i)}$$

The above method is the most straight-forward one, applying page view counts to a language model. If reliable page counts are available, then the estimated probabilities will be good enough. However the following challenges are sometimes encountered.

Regarding a first challenge, page view counts are unknown, but page view ranking based on the counts is available. Actually in many blog sites, page rankings are open to the public. On the other hand, the availability of page view counts is limited.

Regarding a second challenge, page view counts are available, but they are not reliable enough. For example, the page view counts in the short term (e.g., one day) are usually unreliable.

Regarding a third challenge, specific pages on a popular name or event are accessed a large number of times. The above method can fail due to over training. Obtained parameter values are not reliable.

Regarding a fourth challenge, weighting based on page view counts sometimes results in drawbacks due to the use of function words which are not topic-dependent. In particular, it is often the case that function words are usually omitted when provided as inputs to a search engine.

A description will now be given of some variations of the present principles.

In a first alternate embodiment directed to the first challenge described herein before, the following applies. Even if just ranking is available, it is known that page-view follows the Zipf's Law, so we can use estimated frequencies instead of the frequencies themselves. The first alternate embodiment is shown and described with respect to FIG. 4.

FIG. 4 shows a method for correcting N-gram probabilities by page view information, in accordance with a first alternate embodiment of the present principles.

At step 410, estimate page view counts (pv1, pv2, . . . ) from page view rankings using Zipf's Law.

At step 420, store the estimated page view counts (pv1, pv2, . . . ) in a storage element (e.g., a database).

At step 430, count N-grams in each web page (p1, p2, . . . ). Further regarding step 430, an output thereof (denoted by the reference numeral 435) includes the N-gram counts c1(w[i]), c2(w[i]), . . . from p1, p2, . . . .

At step 440, add the N-grams with the weights based on pv1, pv2, . . . . Further regarding step 440, an output thereof (denoted by the reference numeral 445) includes the weighted N-gram counts wc(w[i]).

At step 450, calculate the probability for each N-gram.

In a second alternate embodiment directed to the second and third challenges described herein before, the following applies. Weights are calculated not by the actual page view counts, but by the logarithm of the actual page view counts. In some cases quantization (0, 1, and others) of the actual page view counts or logs thereof could be helpful. Moreover, we estimate N-gram probability in the following two ways: (1) maximum-likelihood ($P_{ml}(w_i)$, no-weighted); and (2) Equation (1) ($P_{pv}(w_i)$, weighted), and interpolate them with $\lambda$, where $\lambda$ is an interpolation coefficient that is chosen with the lowest cross entropy (perplexity), for example, for real transcribed text. Note that this data is called a "development set" and is small enough. $P(w_i)$ is calculated as follows:

$$P(w_i) = \lambda P_{ml}(w_i) + (1+\lambda) P_{pv}(w_i) \quad (2).$$

The second alternate embodiment is shown and described with respect to FIG. 5.

FIG. 5 shows a method for correcting N-gram probabilities by page view information, in accordance with a second alternate embodiment of the present principles.

At step 510, determine page view counts (pv1, pv2, . . . ) from web pages (p1, p2, . . . ).

At step 520, store the page view counts (pv1, pv2, . . . ) in a storage element (e.g., a database).

At step 530, count N-grams in each web page (p1, p2, . . . ). Further regarding step 530, an output thereof (denoted by the reference numeral 535) includes the N-gram counts c1(w[i]), c2(w[i]), . . . from p1, p2, . . . . The output 535 is provided to both steps 540 and 560.

At step 540, add the N-grams with the weights based on pv1, pv2, . . . . Further regarding step 540, an output thereof (denoted by the reference numeral 545) includes the weighted N-gram counts wc(w[i]).

At step 550, calculate the probability for each N-gram.

At step 560, add the N-grams without any weights. Further regarding step 560, an output thereof (denoted by the reference numeral 565) includes the N-gram counts c(w[i]).

At step 570, calculate the probability for each N-gram.

At step 580, interpolate two probabilities for each N-gram, e.g., based on the probabilities for each N-gram calculated at steps 550 and 570.

In a third alternate embodiment directed to the fourth challenge described herein before, the following applies. Many utterances to speech recognizers for search engines are not sentences but word combinations. We can use titles and section headers with page-views for creating a better language model, where low-order N-gram probability is calculated in Equation (1), and the all higher N-gram probabilities are adapted to it using log-linear interpolation. For example, adaptation by the following formula is applicable. This is a sample for 3-gram:

$$P_{adapted}(w_i | w_{i-1} w_{i-2}) = \frac{1}{z} \left( \frac{P_{weighted}(w_i)}{P_{unweighted}(w_i)} \right)^\beta P_{unweighted}(w_i | w_{i-1} w_{i-2})$$

where $P_{adapted}$, $P_{weighted}$ and $P_{unweighted}$ are adapted, weighted, and unweighted N-gram probabilities, respectively. Z is a constant for normalization. $\beta$ is a controlling parameter. The third alternate embodiment is shown and described with respect to FIG. 6.

FIG. 6 shows a method for correcting N-gram probabilities by page view information, in accordance with a third alternate embodiment of the present principles.

At step 610, determine page view counts (pv1, pv2, . . . ) from web pages (p1, p2, . . . ).

At step 620, store the page view counts (pv1, pv2, . . . ) in a storage element (e.g., a database).

At step 630, count N-grams in each web page (p1, p2, . . . ). Further regarding step 630, an output thereof (denoted by the reference numeral 635) includes the N-gram counts c1(w[i]), c2(w[i]), ... from p1, p2, .... The N-grams counts will include 1-gram counts. The output 635 is provided to both steps 640 and 660.

At step 640, add the 1-grams with the weights based on pv1, pv2, .... Further regarding step 640, an output thereof (denoted by the reference numeral 645) includes the weighted 1-gram counts wc(w[i]).

At step 650, calculate the probability for each 1-gram.

At step 660, add the N-grams without any weights. Further regarding step 660, an output thereof (denoted by the reference numeral 665) includes the N-gram counts c(w[i]).

At step 670, calculate the probability for each N-gram.

At step 680, adapt the N-gram probabilities so that they satisfy the weighted 1-gram probability, e.g., based on the probabilities for each 1-gram and N-gram calculated at steps 650 and 670, respectively.

In a fourth alternate embodiment directed to the second and third challenges described herein before, the following applies. Sort web pages according to page view counts and classified them into M subsets ($S_1, S_2, \ldots, S_M$). Count N-grams in each subset, and estimate N-gram probabilities $p_k(w_i)$, $k=1, \ldots, M$ by a maximum likelihood method. Then interpolate these probabilities so that the perplexity (cross entropy) of the development set should be minimized. Final probabilities Pe(wi) will be obtained. This method is formulated as follows:

$$Pe(w_i) = \Sigma_{K=1}^{M} v_k \times P_k(w_i)$$

where the weights $v=(v1, v2, \ldots, v_M)$ are calculated using the following formulae:

$$v = \arg\min_v (-\Sigma_{w_i \in T} v_k p_k(w_i) \log(v_k p_k(w_i)))$$

where $\Sigma_k v_k = 1$. The fourth alternate embodiment is shown and described with respect to FIG. 7.

FIG. 7 shows a method for correcting N-gram probabilities by page view information, in accordance with a fourth alternate embodiment of the present principles.

At step 710, determine page view counts (pv1, pv2, ...) from web pages (p1, p2, ...).

At step 720, store the page view counts (pv1, pv2, ...) in a storage element (e.g., a database).

At step 730, sort the web pages according to page view counts. Further regarding step 730, an output thereof (denoted by the reference numeral 735) includes sorted pages.

At step 740, classify all pages into M subsets according to the page view counts.

At step 750, count the N-grams for the pages in each of the M subsets to obtain N-gram counts therefor.

At step 760, calculate M probabilities for each N-gram.

At step 770, interpolate the M probabilities for each N-gram to obtain interpolated probabilities for each N-gram.

Some of the many benefits of the present principles will now be described. It is expected that we can correct the dependency on text size, which is subject to the numbers of contributors and their eagerness, and create a better language model reflecting on the frequent topics which users really mention. The present principles will make it possible that to perform better modeling for those topics without collecting large amounts of real (field) data, which cannot be collected except by search engine providers.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A non-transitory computer readable storage medium comprising a computer readable program for a method for calculating N-gram probabilities in a language model, wherein the computer readable program when executed on a computer causes the computer to perform the following method steps:
   counting N-grams in each page of a plurality of pages or in each document of a plurality of documents to obtain respective N-gram counts therefor;
   applying weights to the respective N-gram counts based on at least one of view counts and rankings to obtain weighted respective N-gram counts, the view counts and the rankings determined with respect to the plurality of pages or the plurality of documents;
   merging the weighted respective N-gram counts to obtain merged weighted respective N-gram counts for the plurality of pages or the plurality of documents;
   calculating a respective probability for each of the N-grams based on the merged weighted respective N-gram counts; and
   decoding an utterance, by a speech recognition system, based on the N-gram probabilities in the language model.

2. A non-transitory computer readable storage medium comprising a computer readable program for a method for calculating N-gram probabilities in a language model, wherein the computer readable program when executed on a computer causes the computer to perform the following method steps:
   sorting a plurality of pages or a plurality of documents based on at least one of view counts and rankings to obtain sorted pages or sorted documents;
   classifying the sorted pages or the sorted documents into M subsets;
   counting N-grams in each of the M-subsets;
   estimating respective N-gram probabilities for each of the N-grams in each of the M-subsets using a maximum likelihood method;
   interpolating the estimated respective N-gram probabilities to minimize a cross entropy there between; and
   decoding an utterance, by a speech recognition system, based on the N-gram probabilities in the language model.

3. A system for calculating N-gram probabilities in a language model, comprising:
   an N-gram counter for counting N-grams in each page of a plurality of pages or in each document of a plurality of documents to obtain respective N-gram counts therefor;
   a weighted N-gram counter for applying weights to the respective N-gram counts based on at least one of view counts and rankings to obtain weighted respective N-gram counts, the view counts and the rankings determined with respect to the plurality of pages or the plurality of documents;
   an N-gram merger for merging the weighted respective N-gram counts to obtain merged weighted respective N-gram counts for the plurality of pages or the plurality of documents;
   a probability calculator for calculating a respective probability for each of the N-grams based on the merged weighted respective N-gram counts; and a speech recognition system for decoding an utterance based on the N-gram probabilities in the language model.

4. The system of claim 3, wherein the view counts are estimated using Zipf's Law.

5. The system of claim 3, wherein the weights are calculated based on respective logarithms of at least one of the view counts and the rankings.

6. The system of claim 5, wherein the respective logarithms of at least one of the view counts and the rankings are quantized before being used to calculate the weights.

7. The system of claim 3,
    wherein the N-gram merger merges the respective N-grams counts without the weights to obtain merged un-weighted respective N-gram counts, the probability calculator calculates a respective probability for each of the N-grams based on the merged un-weighted respective N-gram counts, and
    wherein the view calculator respectively calculates a final probability for each of the N-grams by interpolating, using a predetermined interpolation coefficient, between the respective probability for a corresponding one of the N-grams based on the merged weighted respective N-gram counts and the respective probability for the corresponding one of the N-grams based on the merged un-weighted respective N-gram counts.

8. The system of claim 7, wherein the respective probability for each of the N-grams based on the merged un-weighted respective N-gram counts is calculated using a maximum likelihood method.

9. The system of claim 7, wherein the interpolation coefficient is determined based on a transcribed text.

10. The system of claim 3, wherein the N-gram merger merges the respective N-grams counts without the weights to obtain merged un-weighted respective N-gram counts, the probability calculator calculates a respective probability for each of the N-grams based on the merged un-weighted respective N-gram counts,
    wherein the N-gram counts to which the weights are applied are 1-gram counts corresponding to 1-grams, the N-gram counts to which the weights are not applied are 2-gram counts or greater corresponding to 2-grams or greater, and
    wherein the probability calculator adapts the respective probability for each of the 2-grams or greater to satisfy the respective probability for at least one of the 1-grams.

* * * * *